(12) United States Patent
Wu

(10) Patent No.: US 12,723,440 B1
(45) Date of Patent: Sep. 1, 2026

(54) ANTI-THEFT BINDING DEVICE AND ANTI-THEFT METHOD

(71) Applicant: Ruochen Wu, Xiaogan (CN)

(72) Inventor: Ruochen Wu, Xiaogan (CN)

( * ) Notice: Subject to any disclaimer, the term of this patent is extended or adjusted under 35 U.S.C. 154(b) by 0 days.

(21) Appl. No.: 19/273,387

(22) Filed: Jul. 18, 2025

(51) Int. Cl.
*E05B 73/00* (2006.01)
*B60R 9/00* (2006.01)

(52) U.S. Cl.
CPC ................ *E05B 73/00* (2013.01); *B60R 9/00* (2013.01)

(58) Field of Classification Search
CPC . E05B 73/00; B60R 9/00; Y10T 70/40; Y10T 70/5009; Y10T 24/4773
USPC .............................................................. 70/14
See application file for complete search history.

(56) References Cited

U.S. PATENT DOCUMENTS 4,440,005 A * 4/1984 Bulle ....................... B60D 1/60 70/34
5,332,251 A * 7/1994 Farquhar .................. B60D 1/60 280/507
5,369,970 A * 12/1994 Voiculescu .............. B60P 7/083 70/49
2005/0193781 A1 * 9/2005 Mathers .............. E05B 73/0076 70/14
2006/0236730 A1 * 10/2006 Wyers ...................... B60D 1/60 70/423

FOREIGN PATENT DOCUMENTS

CN 101677687 A * 3/2010 ............. E05B 67/24
WO WO-03042476 A1 * 5/2003 ........... E05B 73/007

* cited by examiner

*Primary Examiner* — Suzanne L Barrett
(74) *Attorney, Agent, or Firm* — Birchwood IP

(57) ABSTRACT

An anti-theft binding device and an anti-theft method are provided. The anti-theft binding device includes a binding body and an anti-theft component. The binding body is inserted into an insertion hole and rotated around the insertion hole, and the binding body abuts against a wall of the insertion hole. The binding body is not easily detached from the insertion hole and is provided with a binding groove and a fixing hole that are penetrated. The anti-theft component includes an anti-theft lock core and a locking pin. The anti-theft lock core is connected to the locking pin. When the anti-theft component is locked, the locking pin is inserted into the fixing hole, and the anti-theft lock core is locked and connected to the binding body. This application has an effect of reducing the risk of theft of the binding device is installed on vehicles.

7 Claims, 8 Drawing Sheets

ANTI-THEFT BINDING DEVICE AND ANTI-THEFT METHOD

TECHNICAL FIELD

The present disclosure relates to the field of binding device technologies, and in particular, to an anti-theft binding device and an anti-theft method.

BACKGROUND

Some existing truck vehiclego boxes are generally equipped with insertion seats or insertion holes, so that when trucks transport goods or items and need to tie them up, binding devices are set up at each insertion seat or insertion hole, and then ropes are threaded through each binding device to achieve winding and tying of the goods, thereby stabilizing the goods or items in the vehiclego box.

The current binding device generally includes a binding body and a locking pin. The binding body is provided with a binding groove that runs through it, and one end of the binding body is inserted into an insertion hole and contacts the vehiclego box. The binding body is provided with a fixing hole that runs through it, and the locking pin is inserted into the fixing hole, so that the binding body is not easily rotated relative to the insertion hole, thus completing the installation of the binding device.

Regarding the relevant technologies mentioned above, when it is necessary to remove the binding device from the insertion hole, the locking pin is pulled out of the fixing hole, so that the binding body can rotate relative to the insertion hole. Then, the binding body can be easily removed from the insertion hole, which results in the binding device not having anti-theft function when installed on the vehicle, which increases the risk of theft of the binding device.

SUMMARY

In order to reduce the risk of theft of the binding device installed on the vehicle, this application provides an anti-theft binding device and an anti-theft method.

The anti-theft binding device and anti-theft method provided in this application adopt the following technical solution.

An anti-theft binding device, including a binding body and an anti-theft component, where the binding body is inserted into an insertion hole and rotated around the insertion hole, the binding body abuts against a wall of the insertion hole, the binding body is not easy to detach from the insertion hole, and the binding body is provided with a binding groove and a fixing hole that are penetrated through;

- the anti-theft component includes an anti-theft lock core and a locking pin; the anti-theft lock core is connected to the locking pin; when the anti-theft component is locked, the locking pin is inserted into the fixing hole, and the anti-theft lock core is locked and connected to the binding body.

By adopting the above technical solution, when it is necessary to install the binding device in the insertion hole, the binding body is inserted into the insertion hole, and then the binding body is rotated relative to the insertion hole at an appropriate angle, so that the binding body abuts against the wall of the insertion hole, rendering it difficult for the binding body to detach from the insertion hole. Then, the anti-theft component is provided in the binding body, so that the locking pin is inserted into the fixing hole, making it difficult for the binding body to rotate relative to the insertion hole, thereby stabilizing the installation of the binding body in the insertion hole. Finally, the anti-theft lock core is locked with the binding body, making it difficult for the anti-theft component to detach from the binding body, and it is difficult for the locking pin to be detached from the fixing hole, thereby reducing the installation of the binding device in the insertion hole. The risk of theft in the vehicle, and improves the problem that when the binding device needs to be removed from the insertion hole, the locking pin is pulled out of the fixing hole, so that the binding body can rotate relative to the insertion hole, and then the binding body can be easily removed from the insertion hole, which results in the binding device not having anti-theft function when installed on the vehicle, which increases the risk of the binding device being stolen.

In some embodiments of the present disclosure, the binding body is provided with a locking hole, and a locking hole body is provided with a locking groove; when the anti-theft lock core is locked with the binding body, the anti-theft lock core is inserted into the locking hole, and a lock tongue of the anti-theft lock core is inserted into the locking groove.

In some embodiments of the present disclosure, an axis of the anti-theft lock core is not collinear with an axis of the locking pin.

In some embodiments of the present disclosure, the locking component further includes an anti-theft block, and the anti-theft block is connected to the anti-theft lock core and is detachably connected to the locking pin.

In some embodiments of the present disclosure, the anti-theft block is provided with a connection hole and a threaded hole, the threaded hole is communicated to the connection hole, the threaded hole is threaded with a fixing screw, a locking rod is provided with a fixing ring groove, when the locking rod is connected to the anti-theft block, the locking rod is threaded through the connection hole, and the fixing screw is threaded through the fixing ring groove.

In some embodiments of the present disclosure, the anti-theft component further includes an anti-theft cover, when the anti-theft lock core is locked with the binding body, the anti-theft cover is closed to the anti-theft lock core.

In some embodiments of the present disclosure, the anti-theft cover includes a ring body part, a connection part, and a cover closing part; one end of the connection part is fixedly connected to the ring body part, the other end of the connection part is fixedly connected to the cover closing part, the connection part is bent, the ring body part is sleeved on the anti-theft lock core, and the cover closing part covers the anti-theft lock core.

In some embodiments of the present disclosure, the binding body includes a main body, an installation part, and a binding part, the main body part is fixedly connected to the installation part, the main body part is fixedly connected to the binding part, and the binding groove is located at the binding part.

In some embodiments of the present disclosure, a binding groove body is penetrated in a horizontal direction; or the binding groove body is penetrated vertically; or the binding groove body is penetrated in an inclined direction.

An anti-theft method for the anti-theft binding device includes the following steps:

- (a) inserting one end of the binding body into the insertion hole and rotating the binding body until it is abutting against the insertion hole;
- (b) inserting the locking pin into the fixing hole and inserting the anti-theft lock core into a locking hole;
- (c) inserting a key into the anti-theft lock core and turning the key to drive the anti-theft lock core, so that a lock tongue of the anti-theft lock core is inserted into a locking groove to lock the anti-theft component with the binding body; the binding body is not easy to detach from the insertion hole to achieve an anti-theft of the binding device;

(d) opening the anti-theft lock core, by the key, the anti-theft lock core leaving the locking hole, the locking pin being disengaged from the locking hole, and the binding body being disassembled and detached from the insertion hole.

In summary, this application includes at least one beneficial technical effect as follows.

When it is necessary to install the binding device in the insertion hole, the binding body is inserted into the insertion hole, and then the binding body is rotated relative to the insertion hole at an appropriate angle, so that the binding body abuts against the wall of the insertion hole, rendering it difficult for the binding body to be detached from the insertion hole. Then, the anti-theft component is provided in the binding body, so that the locking pin is inserted into the fixing hole, making it difficult for the binding body to rotate relative to the insertion hole, thereby stabilizing the installation of the binding body in the insertion hole. Finally, the anti-theft lock core is locked with the binding body, making it difficult for the anti-theft component to detach from the binding body, and it is difficult for the locking pin to detach from the fixing hole, thereby reducing the installation of the binding device in the insertion hole. The risk of theft in the vehicle, and improves the problem that when the binding device needs to be removed from the insertion hole, the locking pin is pulled out of the fixing hole, so that the binding body can rotate relative to the insertion hole, and then the binding body can be easily removed from the insertion hole, which results in the binding device not having anti-theft function when installed on the vehicle, which increases the risk of the binding device being stolen.

Numeral reference: 1—binding body; 11—main body; 111—fixing hole; 112—locking hole; 1121—locking groove; 12—installation part; 13—binding part; 131—binding groove; 2—anti-theft component; 21—anti-theft block; 211—connection hole; 212—threaded hole; 2121—fixing screw; 22—anti-theft lock core; 23—locking pin; 231—fixing ring groove; 24—anti-theft cover; 241—ring body part; 242—connection part; 243—cover closing part.

DESCRIPTION OF EMBODIMENTS

Further detailed explanation of the present application will be provided in combination with FIGS. 1-8.

Figure 1:
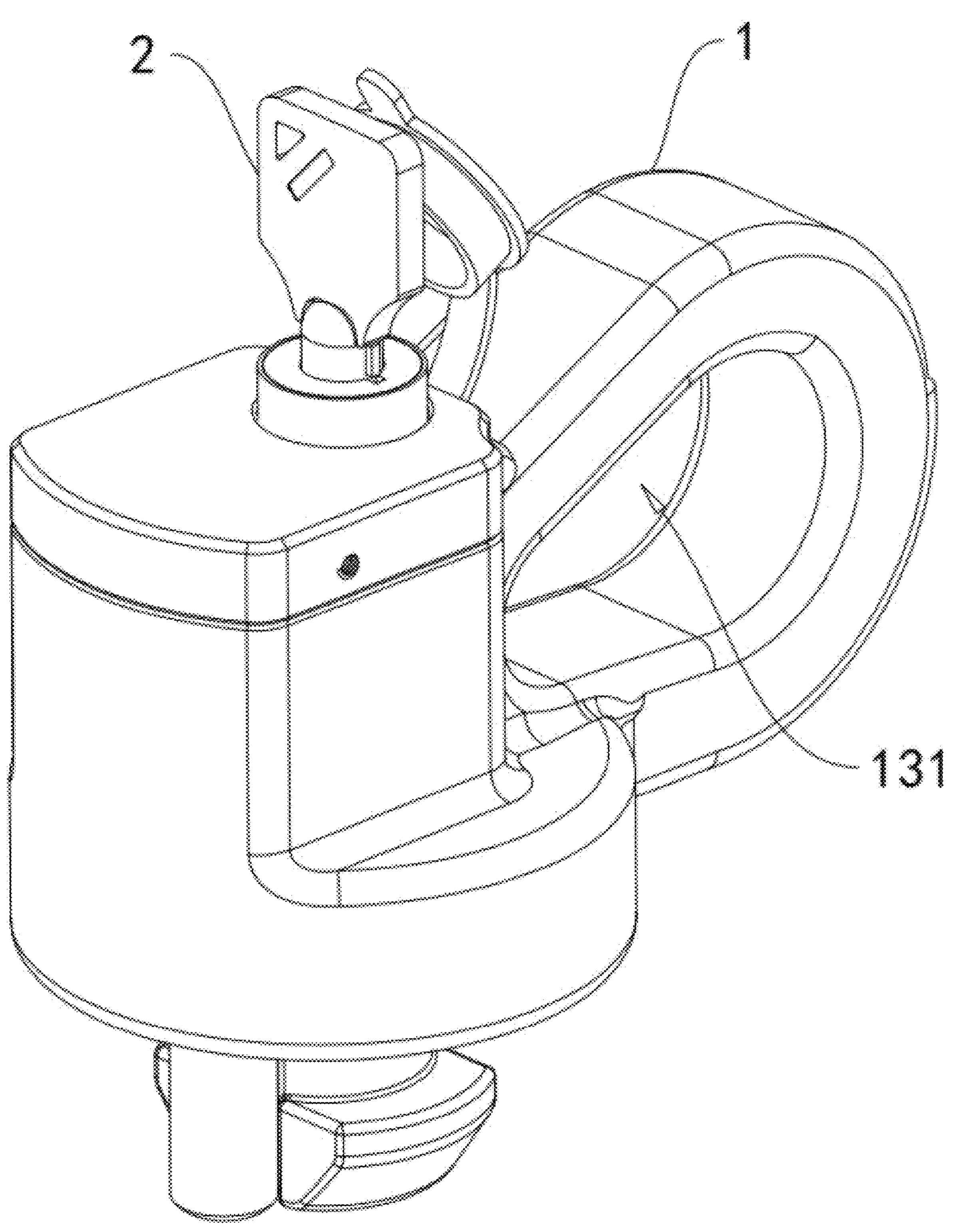
FIG. 1 is a first schematic diagram of an overall structure of an embodiment of the present application.
Figure 2:
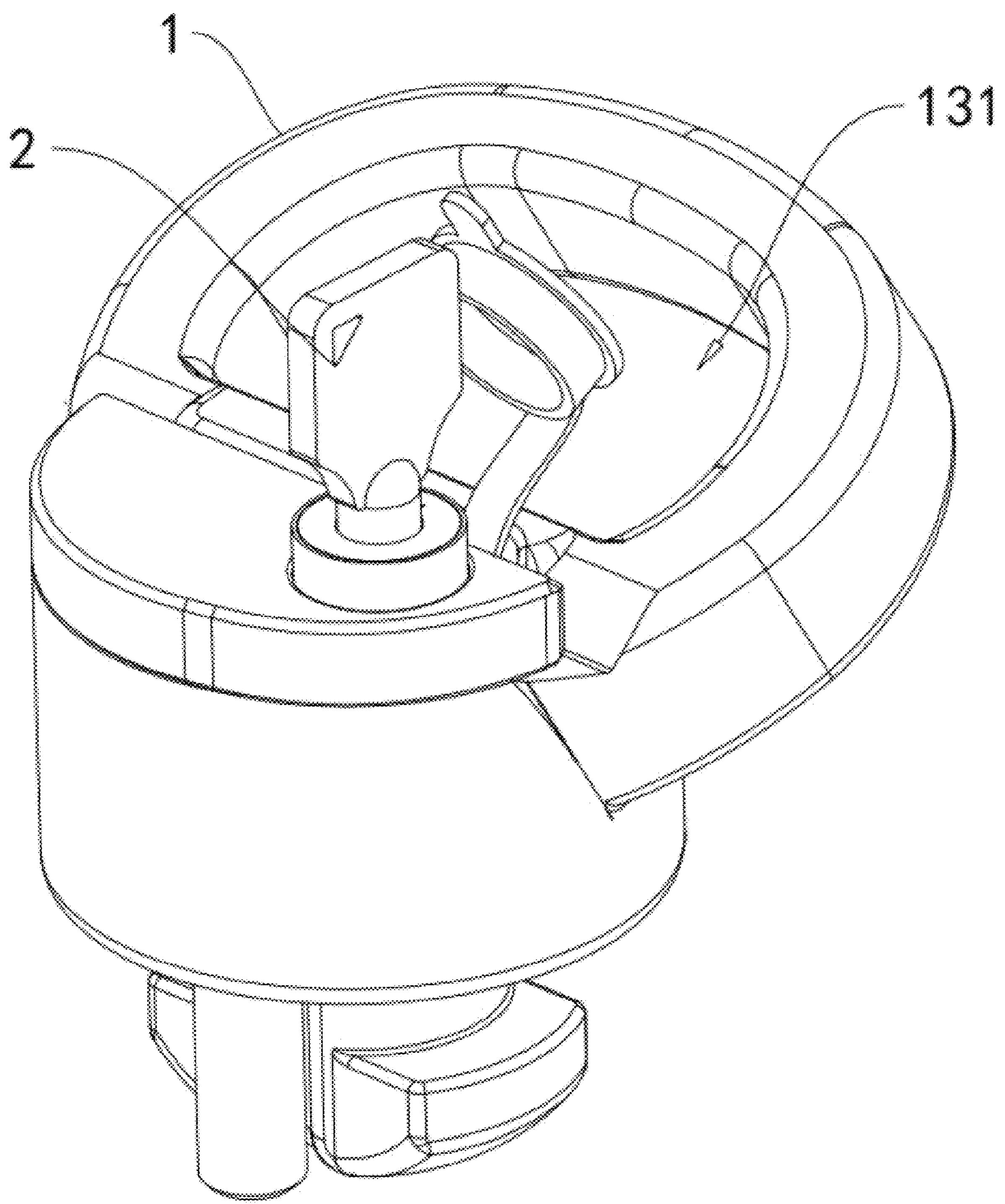
FIG. 2 is a second schematic diagram of an overall structure of an embodiment of the present application.

This application discloses an anti-theft binding device and an anti-theft method. Referring to FIGS. 1 and 2, the anti-theft binding device includes a binding body 1 and an anti-theft component 2, where the anti-theft component 2 is provided on the binding body 1.

Figure 3:
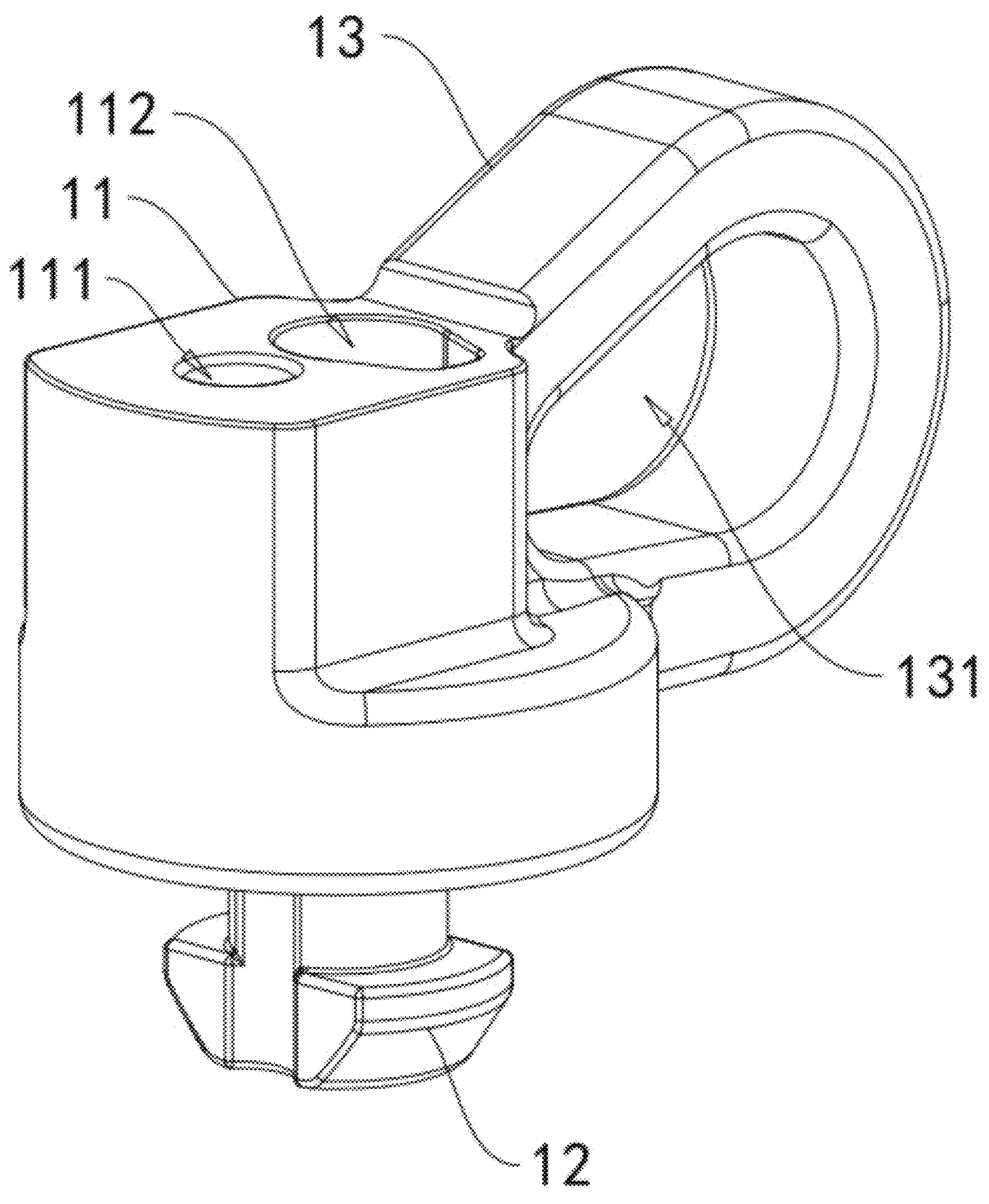
FIG. 3 is a schematic structural diagram of a binding body of an embodiment of the present application.
Figure 4:
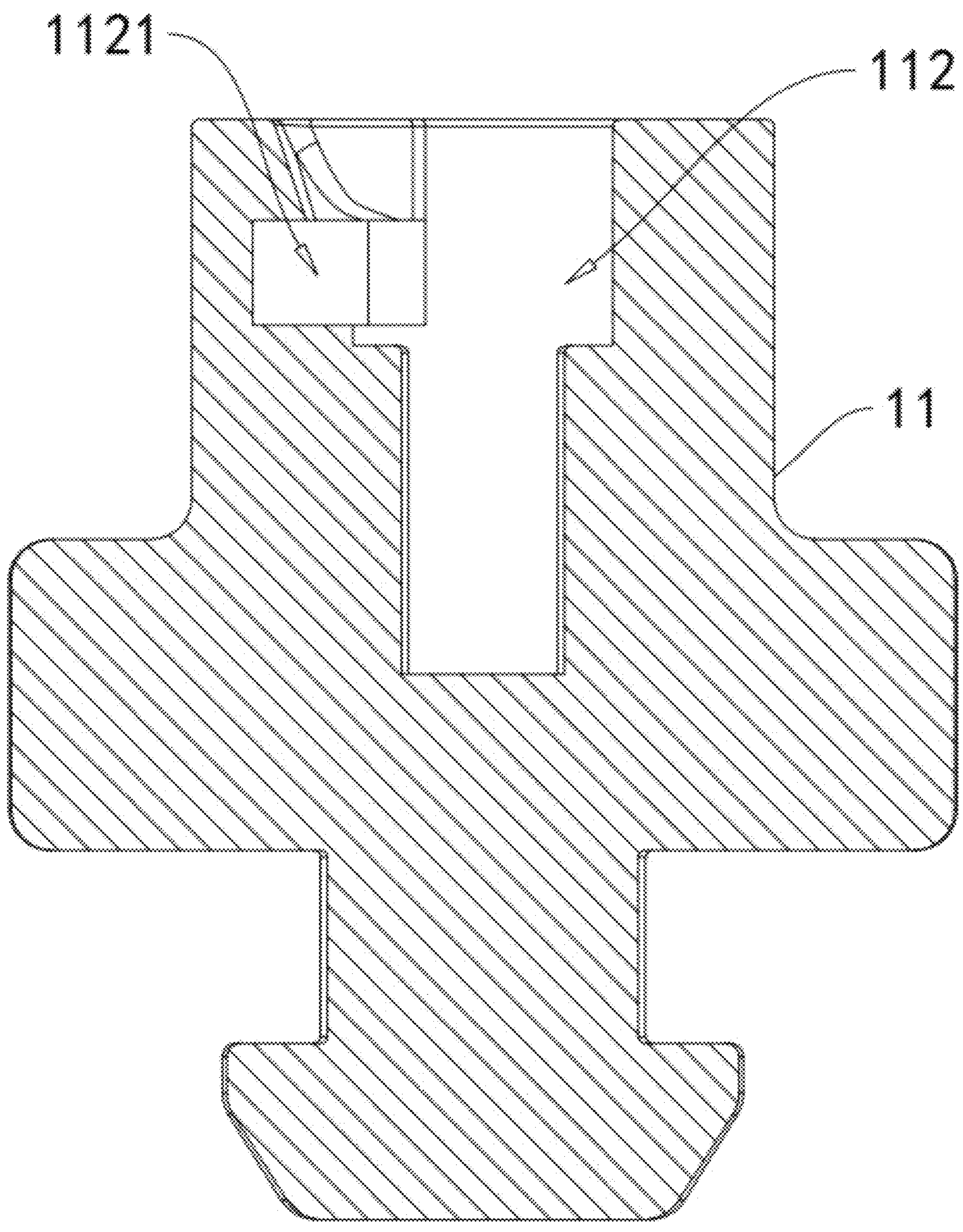
FIG. 4 is a sectional view of the binding body in an embodiment of the present application.

Referring to FIGS. 3 and 4, the binding body 1 includes a main body 11, an installation part 12, and a binding part 13. The main body 11 is circular in a top view. In this embodiment of the present application, an axis direction of the main body 11 is a vertical direction, a direction perpendicular to the vertical direction is a horizontal direction, and a direction between the vertical direction and the horizontal direction is an inclined direction. The main body 11 is provided with a fixing hole 111 that penetrates along the vertical direction, and a locking hole 112 is provided along the vertical direction. A locking groove 1121 is provided in a hole body of the locking hole 112. The installation part 12 is fixedly connected to a bottom of the main body 11, and the binding part 13 is fixedly connected to an outer circumference of the main body 11.

The binding part 13 is provided with a binding groove 131 that runs through it. Referring to FIG. 1, a groove body of the binding groove 131 can run horizontally. The groove body of the binding groove 131 can run vertically. Referring to FIG. 2, the groove body of the binding groove 131 can run in the inclined direction.

Figure 5:
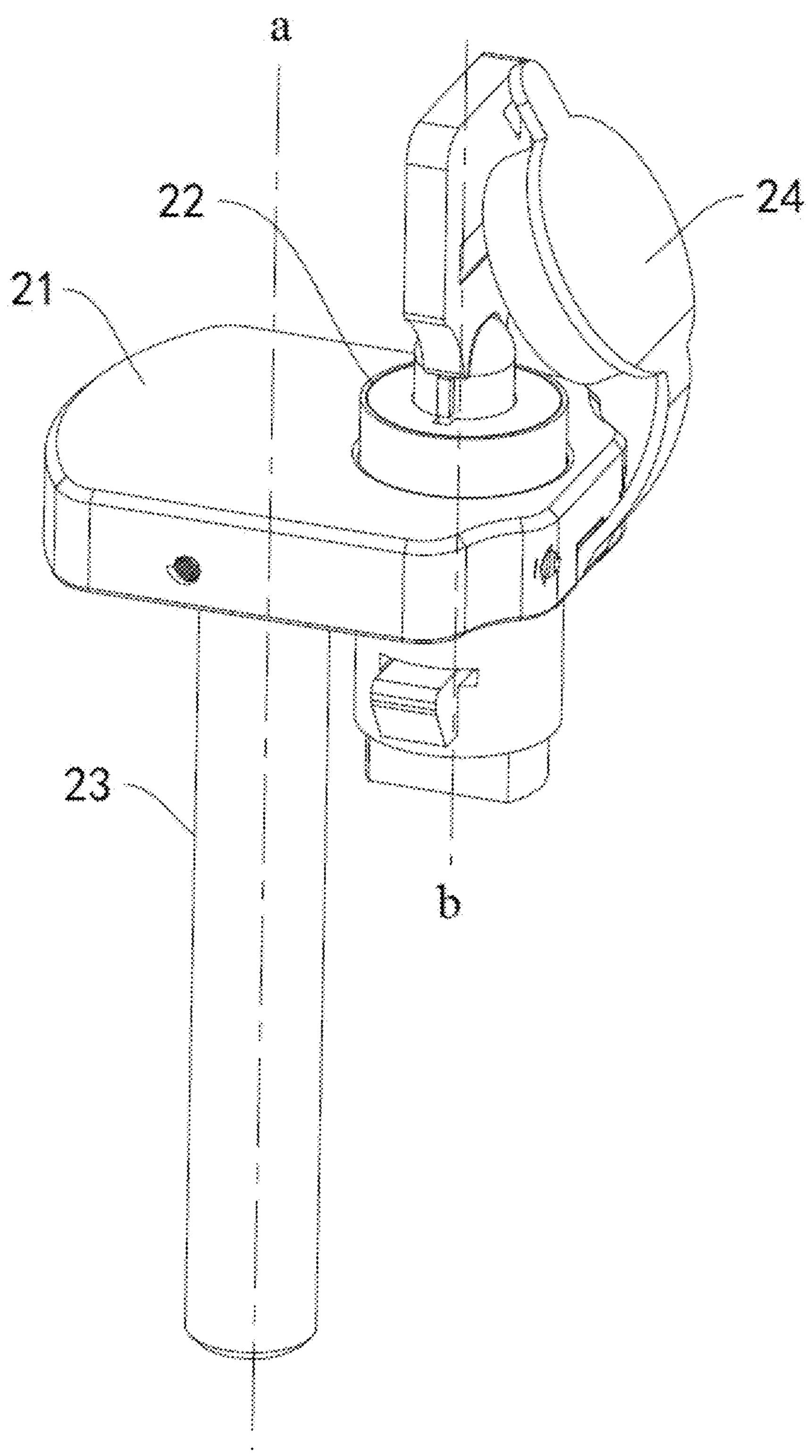
FIG. 5 is a schematic structural diagram of an anti-theft component in an embodiment of the present application.
Figure 6:
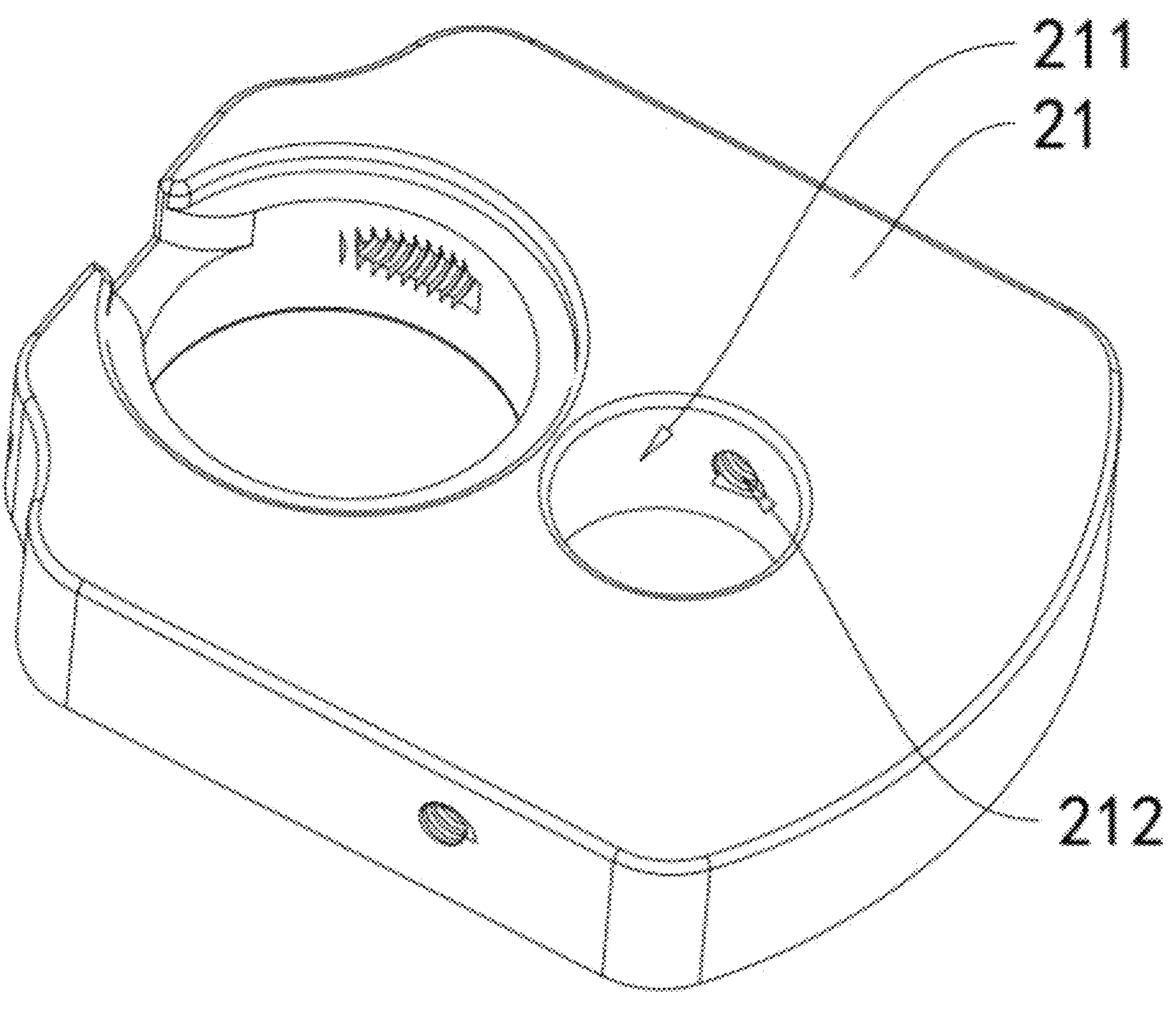
FIG. 6 is a schematic structural diagram of an anti-theft block in an embodiment of the present application.
Figure 7:
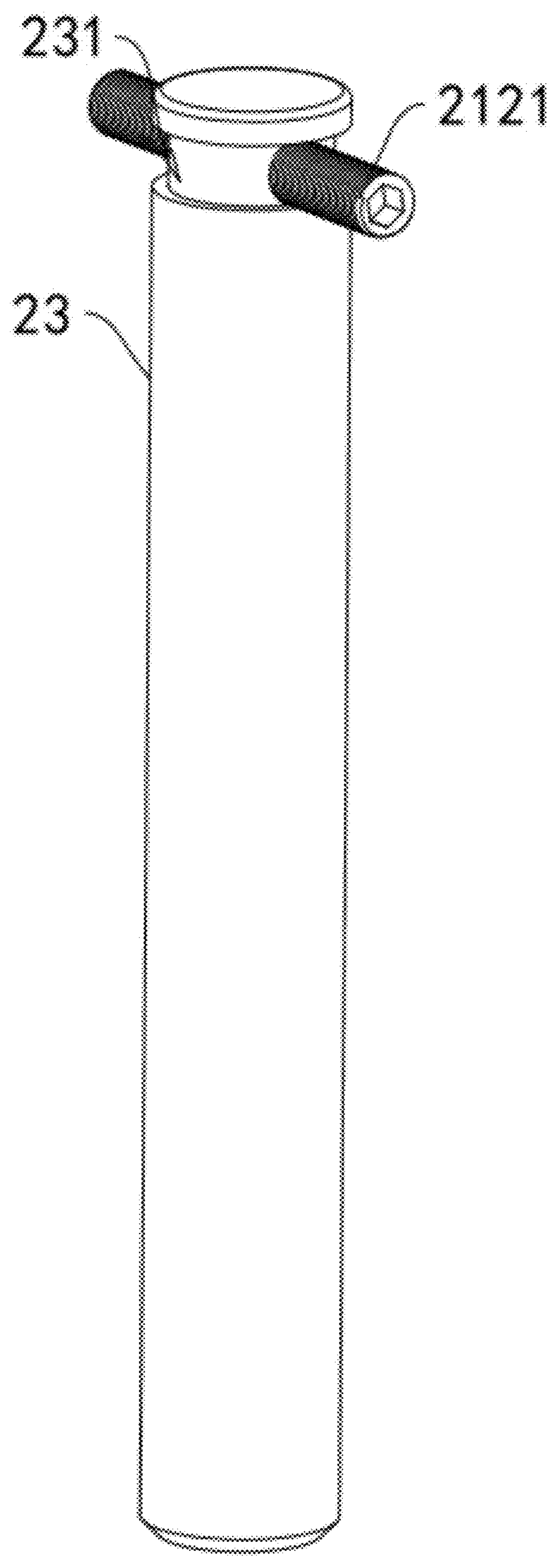
FIG. 7 is a schematic structural diagram of a locking pin in an embodiment of the present application.

Referring to FIGS. 5 to 7, the anti-theft component 2 includes an anti-theft block 21, an anti-theft lock core 22, and a locking pin 23. When the anti-theft block 21 is connected to the binding body 1, the anti-theft block 21 abuts against a top of the main body 11, and the anti-theft lock core 22 is fixedly provided on the anti-theft block 21. When the anti-theft lock core 22 is connected to the binding body 1, the anti-theft lock core 22 is inserted into the locking hole 112. When the anti-theft lock core 22 and the main body 11 need to be locked, a key is inserted into the anti-theft lock core 22, and then the key is turned to drive the anti-theft lock core 22, so that a lock tongue of the anti-theft lock core 22 moves in a direction close to the locking groove 1121 until the lock tongue of the anti-theft lock core 22 penetrates into the locking groove 1121. The anti-theft block 21 is provided with a connection hole 211 and a threaded hole 212, the threaded hole 212 is communicated to the connection hole 211. The threaded hole 212 is threaded with a fixing screw 2121, and a locking rod is provided with a fixing ring groove 231. When the locking rod is connected to the anti-theft block 21, the locking rod is threaded through the connection hole 211, and the fixing screw 2121 is threaded through the fixing ring groove 231, so that the locking rod can be detachably connected to the anti-theft block 21. An axis (b) of the anti-theft lock core 22 is not aligned with an axis (a) of the locking pin 23, which is shown in FIG. 5.

Figure 8:
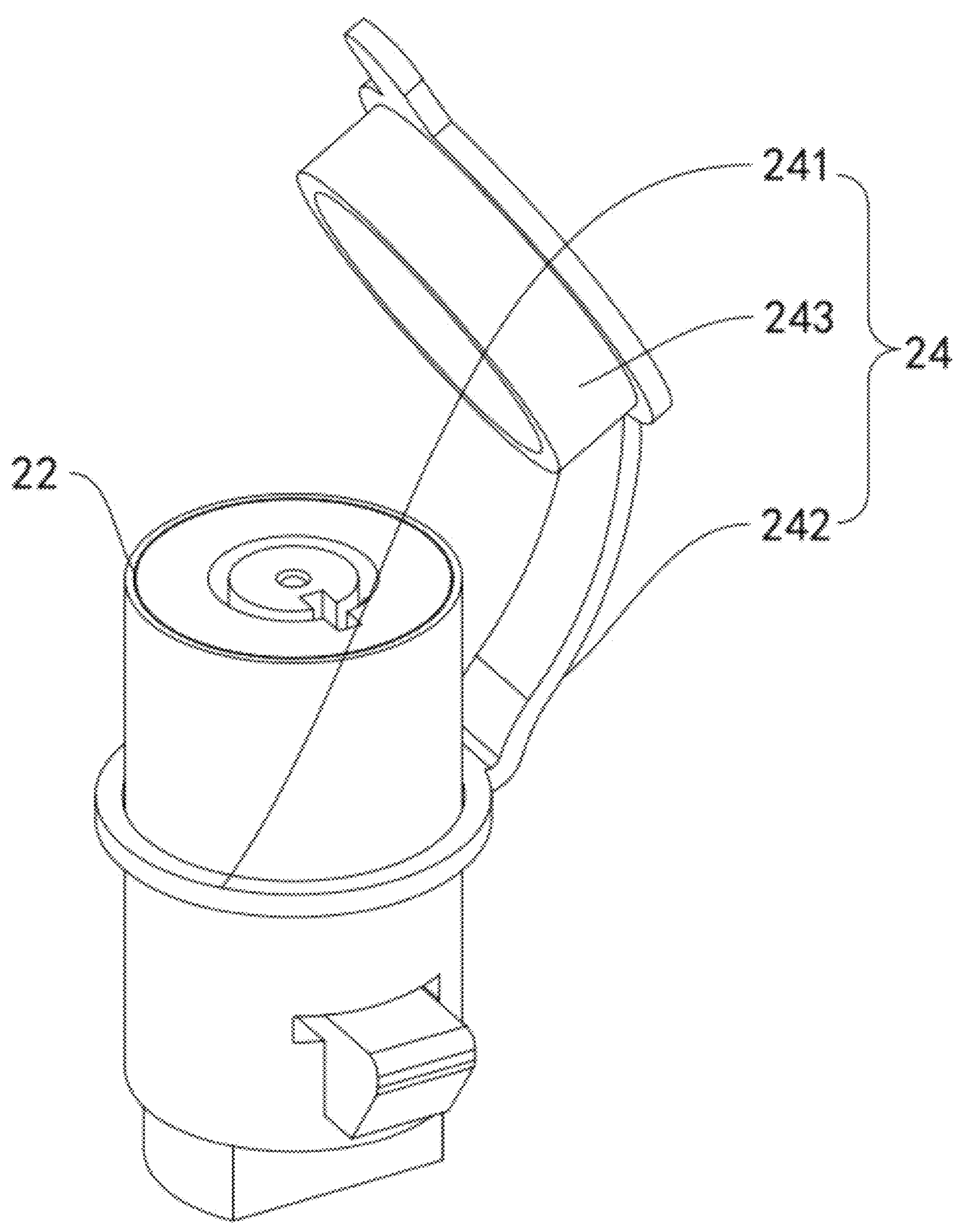
FIG. 8 is a schematic structural diagram of an anti-theft cover according to an embodiment of the present application.

Referring to FIG. 8, the anti-theft component 2 further includes an anti-theft cover 24. The anti-theft cover 24 includes a ring body part 241, a connection part 242, and a cover closing part 243. One end of the connection part 242 is fixedly connected to the ring body part 241, and the other end of the connection part 242 is fixedly connected to the cover closing part 243. The connection part 242 can be bent, and the ring body part 241 is sleeved on the anti-theft lock core 22. The cover closing part 243 covers the anti-theft lock core 22.

The implementation principle of the anti-theft binding device and anti-theft method in this application is as follows: when the binding device needs to be installed in the insertion hole, the binding body 1 is inserted into the insertion hole, and then the binding body 1 is rotated around the insertion hole at an appropriate angle, so that the binding body 1 abuts against the wall of the insertion hole, rendering it difficult for the binding body 1 to detach from the insertion hole. Then, the anti-theft component 2 is placed in the binding body 1, so that the locking pin 23 is inserted into the fixing hole 111, rendering it difficult for the binding body 1 to rotate relative to the insertion hole, so that the binding body 1 is stably provided in the insertion hole. Finally, the anti-theft lock core 22 is locked with the binding body 1, so that the anti-theft component 2 is fixedly placed in the binding body 1, rendering it difficult for the anti-theft component 2 to detach from the binding body 1. Thus, it is difficult for the locking pin 23 to detach from the fixing hole 111, thereby rendering it difficult for the binding body 1 to be removed from the insertion hole. This reduces the risk of theft when the binding device is installed in the vehicle, improves the problem that when the binding device needs to be removed from the insertion hole, the locking pin 23 is pulled out of the fixing hole 111, so that the binding body 1 can rotate relative to the insertion hole, and then the binding body 1 can be easily removed from the insertion hole, resulting in the binding device not having anti-theft function when installed in the vehicle, which increases the risk of theft.

The anti-theft method for the anti-theft binding device, including the following steps:

(a) inserting one end of binding body 1 into the insertion hole and rotating binding body 1 until it is abutting against the insertion hole;

(b) inserting the locking pin 23 into the fixing hole 111 and inserting the anti-theft lock core 22 into a locking hole 112;

(c) inserting a key into the anti-theft lock core 22 and turning the key to drive the anti-theft lock core 22, so that a lock tongue of the anti-theft lock core 22 is inserted into a locking groove 1121 to lock the anti-theft component 2 with the binding body 1; the binding body 1 is not easy to detach from the insertion hole, thus achieving an anti-theft of the binding device;

(d) opening the anti-theft lock core 22, by the key, and the anti-theft lock core 22 leaving the locking hole 112, the locking pin 23 being disengaged from the locking hole 112, and the binding body 1 being disassembled and detached the insertion hole.

The above are preferred embodiments of the present application and do not limit the protection scope of the present application. Therefore, any equivalent changes made according to the structure, shape, and principle of the present application should be included in the protection scope of the present application.

What is claimed is:

1. An anti-theft binding device, comprising a binding body and an anti-theft component, wherein the binding body is inserted into an insertion hole and rotated around the insertion hole, the binding body abuts against a wall of the insertion hole, the binding body is not easy to detach from the insertion hole, and the binding body is provided with a binding groove and a fixing hole that are penetrated through;

the anti-theft component comprises an anti-theft lock core and a locking pin;

the anti-theft lock core is connected to the locking pin;

when the anti-theft component is locked, the locking pin is inserted into the fixing hole, and the anti-theft lock core is locked and connected to the binding body;

wherein an axis of the anti-theft lock core is not collinear with an axis of the locking pin, wherein the anti-theft component further comprises an anti-theft block, wherein the anti-theft block is provided with a connection hole and a threaded hole, the threaded hole is communicated to the connection hole, the threaded hole is threaded with a fixing screw, the locking pin is provided with a fixing ring groove, when the locking pin is connected to the anti-theft block, the locking pin is threaded through the connection hole, and the fixing screw is threaded through the fixing ring groove.

2. The anti-theft binding device according to claim 1, wherein the binding body is provided with a locking hole, and a locking hole body is provided with a locking groove;

when the anti-theft lock core is locked with the binding body, the anti-theft lock core is inserted into the locking hole, and a lock tongue of the anti-theft lock core is inserted into the locking groove.

3. The anti-theft binding device according to claim 1, wherein the anti-theft block is connected to the anti-theft lock core and is detachably connected to the locking pin.

4. The anti-theft binding device according to claim 1, wherein the anti-theft component further comprises an anti-theft cover, when the anti-theft lock core is locked with the binding body, the anti-theft cover is closed to the anti-theft lock core.

5. The anti-theft binding device according to claim 4, wherein the anti-theft cover comprises a ring body part, a connection part, and a cover closing part, one end of the connection part is fixedly connected to the ring body part, the other end of the connection part is fixedly connected to the cover closing part, the connection part is bent, the ring body part is sleeved on the anti-theft lock core, and the cover closing part covers the anti-theft lock core.

6. The anti-theft binding device according to claim 1, wherein the binding body comprises a main body, an installation part, and a binding part, the main body part is fixedly connected to the installation part, the main body part is fixedly connected to the binding part, and the binding groove is located at the binding part.

7. The anti-theft binding device according to claim 6, wherein a binding groove body is penetrated in a horizontal direction; or the binding groove body is penetrated vertically; or the binding groove body is penetrated in an inclined direction.

* * * * *